US010298633B2

(12) United States Patent
George

(10) Patent No.: US 10,298,633 B2
(45) Date of Patent: *May 21, 2019

(54) CLOUD-BASED CONFERENCING ON A MOBILE DEVICE

(71) Applicant: VMware, Inc., Palo Alto, CA (US)

(72) Inventor: Moses George, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/674,247

(22) Filed: Mar. 31, 2015

(65) Prior Publication Data

US 2016/0294887 A1 Oct. 6, 2016

(51) Int. Cl.
*H04L 29/06* (2006.01)
*G06F 3/0481* (2013.01)

(52) U.S. Cl.
CPC .......... *H04L 65/403* (2013.01); *G06F 3/0481* (2013.01); *H04L 65/4069* (2013.01); *G06F 2203/04803* (2013.01)

(58) Field of Classification Search
USPC ........................................ 709/204, 217, 227
See application file for complete search history.

(56) References Cited

U.S. PATENT DOCUMENTS

| 7,693,734 | B2 | 4/2010 | Christenson |
| 2010/0146438 | A1 | 6/2010 | Bush |
| 2011/0267419 | A1* | 11/2011 | Quinn ...................... H04N 7/15 348/14.08 |
| 2012/0207296 | A1* | 8/2012 | George ............... H04M 3/4234 379/204.01 |
| 2013/0018950 | A1 | 1/2013 | Narayanan |
| 2013/0066974 | A1* | 3/2013 | Yoakum ............. H04L 65/1069 709/205 |

(Continued)

OTHER PUBLICATIONS

Office Action dated Oct. 4, 2016 issued for U.S. Appl. No. 14/674,268.

(Continued)

*Primary Examiner* — Younes Naji
*Assistant Examiner* — Da T Ton
(74) *Attorney, Agent, or Firm* — Clayton, McKay & Bailey, PC

(57) ABSTRACT

One or more examples provide a method of attending a scheduled web conference that includes: receiving a notification at a recipient client device authorized by a management server to attend the scheduled web conference; joining the scheduled web conference through a conferencing client application on the recipient client device in response to the notification; receiving a content stream provisioned by the management server at the recipient client device; displaying a live portion of the content stream in a graphical user interface (GUI) of the conferencing client application; and displaying a prior portion of the content stream in the GUI of the conferencing client application in response to user input received through the GUI. Further embodiments include a non-transitory computer-readable storage medium comprising instructions that cause a computer system to carry out the above method above, as well as a computer system configured to carry out the above method.

20 Claims, 6 Drawing Sheets

(56) References Cited

U.S. PATENT DOCUMENTS

| | | | | |
|---|---|---|---|---|
| 2014/0136630 A1* | 5/2014 | Siegel | ............... | G06Q 10/1095 |
| | | | | 709/206 |
| 2014/0149592 A1* | 5/2014 | Krishna | ................. | G06F 1/329 |
| | | | | 709/226 |
| 2014/0280595 A1 | 9/2014 | Mani | | |
| 2015/0079936 A1 | 3/2015 | Gisby | | |
| 2015/0200978 A1 | 7/2015 | Putterman | | |
| 2015/0271401 A1* | 9/2015 | Khoury | ............. | H04N 5/23238 |
| | | | | 348/36 |
| 2016/0065742 A1* | 3/2016 | Nasir | ..................... | H04M 3/56 |
| | | | | 455/416 |

OTHER PUBLICATIONS

Office Action dated Oct. 4, 2017 issued for U.S. Appl. No. 14/674,268.
Office Action dated Apr. 13, 2017 issued for U.S. Appl. No. 14/674,253.
Office Action dated Feb. 7, 2018 issued for U.S. Appl. No. 14/674,253.

* cited by examiner

CLOUD-BASED CONFERENCING ON A MOBILE DEVICE

CROSS-REFERENCE TO RELATED APPLICATIONS

This application is related to U.S. patent application Ser. No. 14/674,268 filed Mar. 31, 2015, (entitled "Cloud-based Conferencing System"), and U.S. patent application Ser. No. 14/674,253, filed Mar. 31, 2015 (entitled "Cloud-based Conferencing System"), each of which is incorporated by reference herein.

BACKGROUND

Recently, enterprises have experienced a substantial increase in their productivity when providing their employees with access to enterprise resources via client devices (e.g., smartphones, tablets, laptops). As the cost of client devices continues to decrease and the computing power of client devices continues to increase, it has become more feasible for employees to utilize client devices to complete most (if not all) of their work duties. Consequently, information technology departments ("I.T. Dept") struggle with striking a balance between providing employees with access to enterprise resources (e.g., data) and ensuring the security and integrity of enterprise resources. A common solution for this problem is having an I.T. Dept. remotely manage client devices with access to enterprise data. However, I.T. Depts. continue to be challenged in ensuring that restricted actions are not performed via unauthorized applications on client devices.

A web conferencing service is one type of enterprise resource employees would like to access using their client devices. A web conferencing service allows a host to provide content to one or more recipients through a network, such as an enterprise intranet, public Internet, or combination thereof. The content can include text-based messages, voice, video, images, and the like. I.T. Depts. face the challenge of providing web conferencing services that integrate seamlessly with employee client devices, while providing efficient and secure access to enterprise resources.

One or more embodiments provide a cloud-based conferencing system on a mobile device. In an embodiment, as method of attending a scheduled web conference includes: receiving a notification at a recipient client device authorized by a management server to attend the scheduled web conference; joining the scheduled we conference through a conferencing client application on the recipient client device in response to the notification; receiving a content stream provisioned by the management server at the recipient client device; displaying a live portion of the content stream in a graphical user interface (GUI) of the conferencing client application; and displaying a prior portion of the content stream in the GUI of the conferencing client application in response to user input received through the GUI.

Further embodiments include a computer system and a non-transitory computer-readable storage medium comprising instructions that cause a computer system to carry out the above method above.

BRIEF DESCRIPTION OF THE DRAWINGS

To facilitate understanding, identical reference numerals have been used were possible, to designate identical elements that are common to the figures. It is contemplated that elements disclosed in one embodiment may be beneficially utilized on other embodiments without specific recitation.

DETAILED DESCRIPTION

For purposes of convenience, some elements of the Figs. are depicted and described in the singular, although it will be understood that a plurality of each element may be employed in the arrangements as described herein; for ease of understanding, the elements of the Figs. include designations that the element may be either singular or plural (e.g., client device(s), management server(s), and the like).

Figure 1:
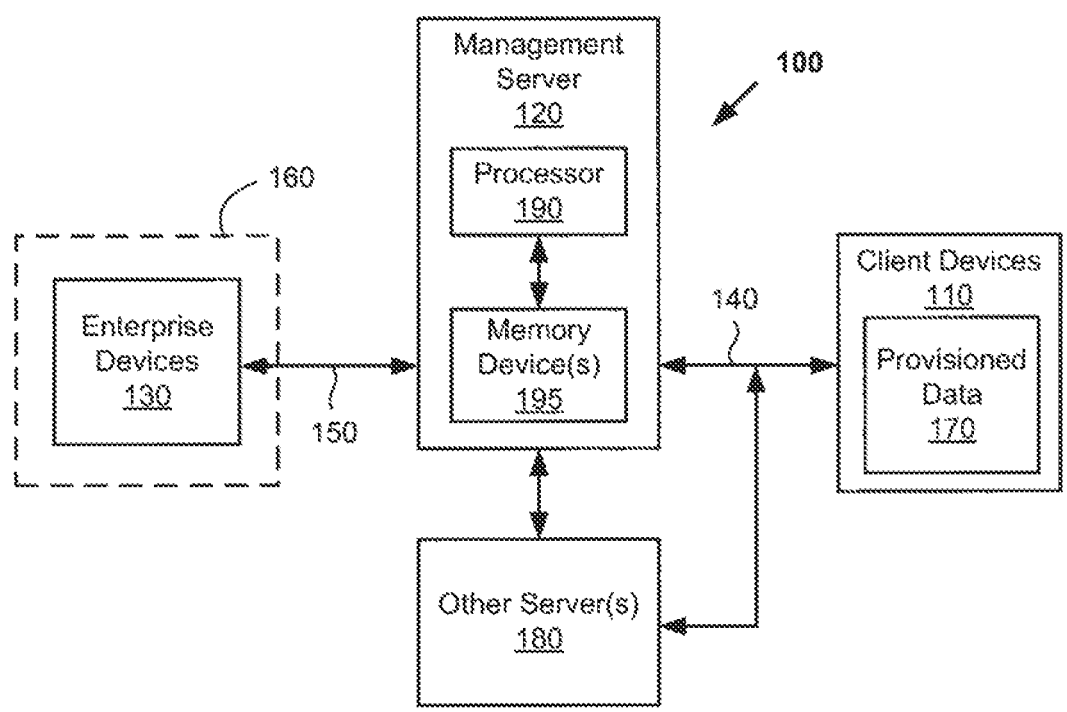
FIG. 1 is a block diagram illustrating an operating environment in which embodiments consistent with this disclosure may be practiced.

FIG. 1 is a block diagram illustrating an operating environment 100 in which embodiments consistent with this disclosure may be practiced. Operating environment 100 includes client devices 110, a management server 120, and enterprise devices 130. In some embodiments, operating environment 100 includes one or more other servers 180, as discussed below. Management server 120 is communicatively coupled to client devices 110 through network(s) 140. When present, other server(s) 180 are communicatively coupled to cheat devices 110 through network(s) 140. Management server is communicatively coupled to enterprise devices 130 through network(s) 150. Network(s) 140 and network(s) 150 can include wired and/or wireless networks, such as a wireless local area network (WLAN), a wireless wide area network (WWAN), an Ethernet network, a fiber-optic network, and the like, as well as combinations of such networks. Network(s) 140 and network(s) 150 can also include, or otherwise provide access to, the public Internet, an intranet, an extranet, a microwave network, a satellite communications network, a cellular network (e.g., LTE, LTE-A, GSM, CDMA, or the like), infrared communication network, global area network, or any combination of such networks. Client devices 110 may connect to network(s) 140 via a wired connection (e.g., Ethernet, universal serial bus (USE), etc.) or via a wireless connection (e.g., Wi-Fi, BLUETOOTH, near field communications (NFC), etc). Likewise, enterprise devices 130 can connect to network(s) 150 via any such wired or wireless connections.

Enterprise devices 130 and client devices 110 refer to any electronic device configured to communicate over a network. Enterprise devices 130 can be physically located in enterprise locations 160. Enterprise devices 130 are managed by an enterprise (e.g., an I.T. Dept. of an enterprise) for use in a particular enterprise location. Enterprise locations 160 can include, for example, offices, conference rooms, and the like within an enterprise. As defined and used herein, the term "enterprise" may refer to an entity and/or group of individuals, such as a business, institution or an association, that has at least one collective goal, such as financial, social and/or humanitarian goals. Thus, the term "enterprise" may include corporations, governments, non-governmental organizations, international organizations, armed forces, charities, not-for-profit corporations, partnerships, cooperatives, universities, political organizations, mixed public-private organizations, and voluntary associations. As defined and used herein, the term "I.T. Dept." may refer to a sub-collection of individuals within an "enterprise" that oversees the electronic communications of the "enterprise" in an effort to ensure that data associated with the "enterprise" is protected from unauthorized access. Thus, the "I.T. Dept." may oversee configuring client devices, servers, and/or networks, which may be based at least in part on access rights antler authority of personnel within the "enterprise" utilizing such client devices, servers and/or networks for "enterprise" uses.

Client devices 110 are managed b a user (e.g., employee of the enterprise) or by both the user and the enterprise. For example, particular client devices may refer to a mobile telephone, smartphone, tablet computer, personal digital assistant (PDA), pager, wearable device, projected interface, desktop or laptop computer, game console, or any of numerous fixed or portable communication devices, computation devices, content generation devices, content consumption devices, or combinations thereof.

An I.T. Dept. can use management server 120 to manage client devices 110. In certain embodiments, management of client devices 110 may include designating particular provisioned data 170 for transmission to client devices 110. In some embodiments, management of client devices 110 may include provisioning (e.g., transmitting) particular provisioned data 170 to client devices 110. In any case, depending on the capabilities of a particular client device, (e.g., limitations of the operating system), the client device can be managed by "pushing" certain provisioned data 170 from management server 120 to the client device or by instructing the client device to "pull" certain provisioned data 170 from management server 120. In some embodiments, management server 120 can cooperate with other server(s) 180 to cause certain provisioned data 170 to be pushed to the client device. Management server 120 can instruct the client device to pull certain provisioned data 170 from other server(s) 180.

In embodiments, management server 120 is configured to provide a cloud-based conferencing service. Alternatively, management server 120 can cooperate with other server(s) 180 to provide a cloud-based conferencing service. The cloud-based conferencing service provides centralized content storage and distribution for web conferences involving client devices 110 and enterprise devices 110. In particular, the cloud-based conferencing service can relay a content stream from a host client device to an enterprise device, such as a projector, television, or other type of display or to any device coupled to such a projector, television, or other type of display. The cloud-based conferencing service can leverage the management service provided by management server 120 to provide secure access to content streams of web conferences among authorized recipient client devices. The cloud-based conference service can further leverage the management service to provision a conference client application on client devices 110 used to schedule web conferences, initiate web conferences, and join web conferences. The conference client application can buffer content streams of web conferences so that users can seek back and forth through the content streams while the content streams are being presented. In addition, management server 120 can record content streams for web conferences, allowing recipient client devices to receive the full content stream regardless of when the user joins a web conference.

Management server 120 can include can include at least one processor 190 (e.g., a processor, co-processor, and/or processing circuitry) and at least one memory device 195. Memory device 195 may comprise volatile (e.g., random access memory (RAM)), non-volatile (e.g., read-only memory (ROM)), flash memory, or any combination thereof). Memory device 195 may store executable programs (e.g., program code instructions) and related data components of various applications, services, and modules for execution by processor 190, as shown below in FIG. 2. Memory device 195 may be communicatively coupled to processor 190 (e.g., through at least one system bus for transferring data there between). Management server 120 can include other well-known components, such as storage devices, input/output (IO) devices, support circuits, and the like.

Figure 2:
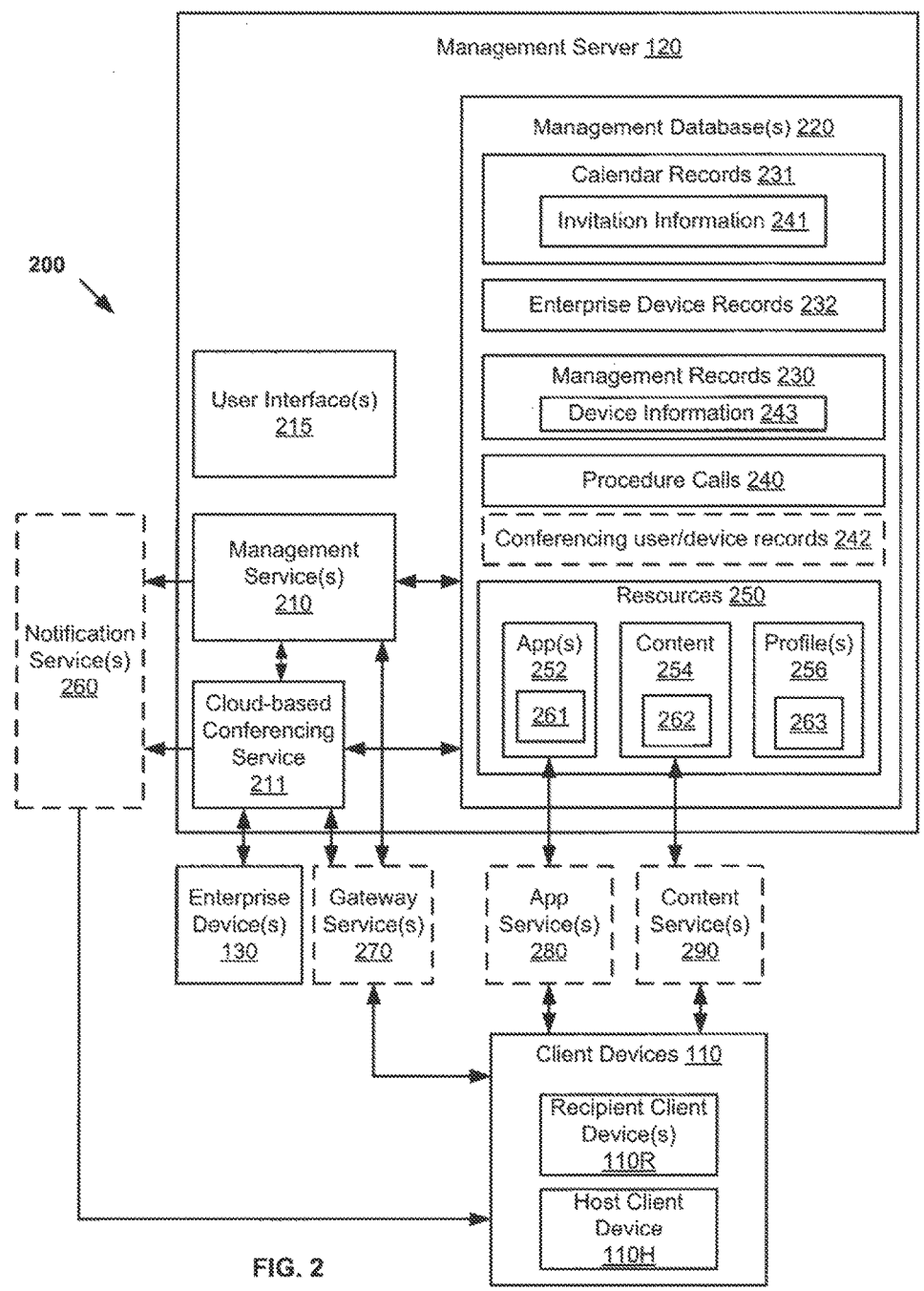
FIG. 2 is a block diagram illustrating an example management system that can provide a web conferencing service.

FIG. 2 is a block diagram illustrating an example management system 200 that can provide a cloud-based conferencing system. While FIG. 2 illustrates one example configuration of management system 200, numerous other configurations can be used according to other example embodiments. Management system 200 includes client devices 110 and management server 120. In some embodiments, management system 200 includes notification service(s) 260, gateway service(s) 270, app service(s) 280, and content service(s) 290. Notification service(s) 260, gateway service(s) 270, app service(s) 280, and content service(s) 290 can be provided by one or more other servers 180. In some embodiments, notification service(s) 260, gateway service(s) 270, app service(s) 280, or content service(s) 290, or any combination thereof, can be provided by management server 120 either as separate service(s), or as part of another service (e.g., management service 210 discussed below).

In certain embodiments, management server 120 may be any type of network-accessible electronic device or system that provides network services, such as a management service 210 and a cloud-based conferencing service 211, and a storage medium, such as a management database 220. In some embodiments, management server) may comprise a cloud server used solution, a physical server-based solution, and/or combinations thereof configured to provide device, content, application, network connection, and/or expense management capability. For purposes of convenience, management server 120 is referred to herein in the singular, although it will be understood that a plurality of management servers may be employed in the arrangements as described herein; for instance, multiple management servers 120 may operate on the same server computer or on multiple server computers.

In certain embodiments, management service 210 and cloud-based conferencing service 211 may be applications installed on management server 120. In some embodiments, management service 210 and cloud-based conferencing service 211 may be configured to access data stored within management database 220 during performance of their operations. Management service 210 is operable to provide management capabilities with respect to client devices 110. For example, in one embodiment, management service 210 may include at least one of AirWatch™, VMware Horizon™, or Apple OSX Server™. Cloud-based conferencing service 211 is operable to provide web conferencing capabilities to client devices 110 and enterprise devices 130. Cloud-based conferencing service 211 can leverage management service 210 to perform various operations, such as authorizing users and client devices to access content, and provisioning a conferencing client application to client devices.

In certain embodiments, management service 210 may be configured to communicate with client devices 110 (and/or gateway service 270, app service 280, and/or content service 290) over a network (depicted in FIG. 1) to provide management capabilities. For instance, an I.T. Dept. of an enterprise may manage client devices 110 via management service 210 by performing at least one management operation with respect to client devices 110. For instance, management service 210 may be configured to transmit at least one procedure call 240 to a client device, as described herein. Additionally, for example, management service 210 may be configured to prevision at least one resource 350 to a client device, as described herein.

In certain embodiments, management database 220 may store a variety of management data, including management records 230. Management database 220 may also store a variety of data that can be provisioned to client devices 110 (e.g., provisioned data 170), which may include procedure calls 240 and/or resources 250. Each of these possible components of management database 220 will now be described in further detail.

In certain embodiments, a management record 230 may be a file that is specific to (e.g., associated with) a client device; that is, a particular management record 230 may include data relevant to a particular client device 110, such that the particular management record 230 is not applicable to other client devices 110. Management record(s) 230 may include a plurality of information (device information 243) describing the management of client devices 110 (e.g., by management server 120). For example, management record(s) 230 can include: a history of management operations on certain client devices taken by management service 210, which resource(s) 250 have been designated for provisioning to certain client device, credentials for a user and/or certain client devices, status information pertaining to certain client devices, and the like. Management service 210 can update management record(s) 230 on an ongoing basis.

In certain embodiments, a procedure call 240 may be configured to communicate with an application programming interface (API) of a client device 110, such that the client device recognizes the procedure call as a valid and authorized instruction to carry out certain procedures on the client device (e.g., procedures specific to the procedure call, whose respective programming code may be stored in a platform library (shown in FIG. 3) of the client device). In some embodiments, a procedure call 240 may be enforced upon a client device 110 by management service 210. More specifically, management service 210 may transmit a procedure call 240 to a client device 110, which may be enforced on the client device via the procedure call's interaction with the platform library of the client device (e.g., through an API), as described herein. Procedure calls 240 may include instructions to carry out operation(s), such as storing data, erasing data, encrypting data, installing an application, locking a screen, rebooting, presenting notifications to a user, and the like.

In certain embodiments, resources 250 may include app(s) 252, content 254, and profile(s) 256. App(s) 252 can include application software configured for execution on client devices 110. In an embodiment, app(s) 252 include a conferencing client application 261, which is described further below. Content 254 may include any electronic files (and the information contained therein) that provide intellectual value for a user. In general, content 254 may include at least one of the following electronic file types: data, audio, video, two-dimensional images, three-dimensional images, raster images, vector images, page layouts, text, word processor files, spreadsheets, presentations, graphics, databases, executable files, CAD files, web files, plug-ins, fonts, system files, settings, encoded files, compressed files, disk images, source code, and/or backup files. In an embodiment, content 254 includes content stream(s) 262 generated as a result of web conference(s), as described below.

Profile(s) 256 may include any electronic files that modify (e.g., configure, constrain, restrict, add to, enhance) the manner in which particular client devices 110 may be operated. Profile(s) 256 can include user information 263. User information 263 can include identifiers and authorization credentials, which facilitate client devices 110 in accessing resources 250. In some embodiments, user information 263 can include at least one of the following: client device 110 identifier(s) (e.g., name(s), UDID(s), phone number(s), IMEI/MEID number(s), serial number(s), IMSI number(s), model(s), version(s), manufacturer(s), Wi-Fi address(es), Wi-Fi MAC, current MCC, current MNC, SIM card number(s), SIM carrier network), user identifier(s) (e.g., username(s), user password(s), user personal identification number(s)), certificate(s), token(s), Smartcard(s), drivers license number(s), and social security number(s).

Returning to management service 210, management service 210 may provide management capabilities with respect to certain client devices 110 and the above-described data stored by management database 220. In some embodiments, management service 210 may provide a user interface 215 through which an administrator may provide management inputs to management service 210 that may instruct management service 210 to perform certain management operations with respect to certain client devices 110. User interface 215 may, for instance, provide a plurality of "management dashboards" that may assist in receiving management inputs from a user. For instance, user interface 215 (and included management dashboards) may provide the capability to initiate certain management operations with respect to certain client devices 110 (e.g., a determination of whether a client device is compliant with a profile, a designation of a procedure call for provision to (and enforcement upon) a client device, a designation of a resource for provisioning to a client device). Management service 210 can also perform management operations on behalf of cloud-based conferencing service 211, as described below.

As described herein, in certain embodiments, notification service(s) 260, gateway service(s) 270, app service(s) 280, and content service(s) 290 may assist management server 120 in providing management capabilities with respect to client devices 110. Each of these additional components of management system 200 will now be described in further detail.

In certain embodiments, app service(s) 280 or content service(s) 290 may store and distribute apps 252 and/or content 254, respectively, in some embodiments, app service(s) 280 or content service(s) 290 can proxy apps 252 or content 254, respectively, to certain client devices 110 from management server 120. For instance, app service(s) 280 or content service(s) 290 may receive apps 252 or content 254, respectively, from management server 120, and may relay or distribute the received apps 252 or content 254 to certain client devices 110. In some embodiments, such as when app service(s) 280 or content service(s) 290 act as a proxy, management service 210 may distribute procedure calls 240 to app service(s) 280 or content service(s) 290, which may instruct app service(s) 280 or content service(s) 290 to perform certain functionality.

App service(s) 280 may comprise at least one app store, also referred to as an application repository, from which client devices 110 may download apps 252, such as the AirWatch App Catalogue™, Apple iOS App Store™, Google Play Store™, BlackBerry Work™, Windows Phone Store™, Amazon Appstore™, Slide ME™, Steam™, Windows Store™, Mac App Store™, or Ubuntu Software Center™. In one embodiment, app service(s) 280 may comprise a service that executes apps 252 that the client device 110 may access over a network (i.e., web-based apps 252), such as GoogleApps™. In one embodiment, app service(s) 280 may be specific to the capabilities of client devices 110. For instance, app service(s) 280 may be specific to the operating system (depicted in FIG. 3) of certain client devices 110; that is, certain client devices 110 may communicate with a particular app service 280 that correlates with the operating system thereof. Thus, for example, a client device 110 running the Apple iOS operating system may be configured to communicate with the Apple iOS App Store, through which the client device 110 may access apps 252 specific to the Apple iOS operating system of the client device 110 (i.e., apps 252 capable of being executed by Apple iOS operating system). Additionally, in some embodiments, certain client devices 110 may only be permitted (or configured) to communicate with a particular app service 280 that is associated with such client devices 110 (e.g., an app service 280 specific to the capabilities of the certain client devices 110, specific to a management agent of the certain client devices 110, or specific to the management service 210).

In certain embodiments, content service(s) 290 may comprise at least one content store (e.g., file repositories), such as Salesforce.com™, Dropbox™, Box™, Egnyte™, NetSuite™, Citrix ShareFile™, Rackspace™, Amazon Web Services™, Google Drive™, BackupGenie™, SugarSync™, Mozy™, Bitcasa Infinite Drive™, MediaFire™, Mega™, Uhunto One™, Huddle™, Evernote™, Microsoft SharePoint™, Microsoft Office365™, Microsoft SkyDrive™, or Apple iCloud™. In some embodiments, content service(s) 290 may include at least one email service (e.g., a service configured to distribute email to the client device 110), such as Microsoft Exchange™, Novell GroupWise™, Lotus Notes™, or Google GMail™. In some embodiments, similar to app service(s) 280, content service(s) 290 may be specific to the capabilities of certain client devices 110 such that the certain client devices 110 may receive content 254 that the certain client devices 110 are capable of accessing. For instance, a client device 110 may communicate with a particular content service 290 based at least in part on the apps 252 accessible to the client device 110, such that the client device 110 may receive content 254 that is accessible (e.g., that may be rendered) by such apps 252. Alternatively, for example, content service(s) 290 may distribute particular content 254 to a client device 110 based on the apps 252 accessible to the client device 110, such that the client device 110 does not receive content 254 that cannot be accessed (e.g., as a result of needing a particular app 252 that is not accessible to the client device 110).

In certain embodiments, management service 210 can transmit notifications to such client devices 110 through notification service(s) 260 (e.g., requests to check-in with management service 210 or requests to join a scheduled web conference handled by cloud-based conferencing service 211). In certain embodiments, gateway service 270 may be configured to allow certain client devices 110 to communicate with management service 210 and cloud-based conferencing service 211.

In some embodiments, any or all of app service(s) 280, content service(s) 290, gateway service(s) 270, and notification service(s) 260 can omitted. Any omitted services can be provided by management server 120 or a component of management server 120 (e.g., management service 210). For example, client devices 110 can receive resources 250 directly from management server 120. Client devices 110 can receive notifications directly from management service 120. Client devices 110 can communicate directly with management service 210 or cloud-based conferencing service 211.

Aspects of cloud-based conferencing service 211 are now described. Management system 200 provides a cloud-based conferencing system to handle web conferences in an efficient manner. The cloud-based conferencing system includes management server 120 and client devices 110. Some or all of client devices 110 can be managed through management service 210. For a given web conference, a host client device 110H initiates a web conference through cloud-based conferencing service 211. Host client device 110H sends a content stream for the web conference to management server 120. In some embodiments, recipient client device(s) 110R communicate with management server 120 to obtain access to a content stream of the web conference. Management server 120 relays the content stream to authorized recipient client device(s) 110R. In some embodiments, management server 120 communicates with enterprise device(s) 130 to provide the content stream for display. In some embodiments, management server 120 provides the content stream to both recipient client device(s) 110R and enterprise device(s) 130. In certain embodiments, cloud-based conferencing, service 211 leverages management service 210 to enroll host client device 110H and recipient client device(s) 110R for management, provision conferencing client application 261 to host client device 110H and recipient client device(s) 110R, and authorize host client device 110H and recipient client device(s) 110R for access to management server 120, in particular, access to content streams 262.

In some embodiments, management database(s) 220 can store calendar records 231. Calendar records 231 can maintain a calendar of scheduled web conferences, lists of invitees to web conferences, lists of reserved resources for web conferences (e.g., enterprise devices 130), and the like. Calendar records 231 can include invitation information 241 that specifies users authorized to attend each scheduled web conference, enterprise resources reserved for each scheduled we conference, or both. In addition to identifying authorized users, invitation information 241 can specify client devices authorized to be used during each scheduled we conference (e.g., specific client devices by identifier or specific client devices by some other attribute, such as type of device). In some embodiments, cloud-based conferencing service 211 can cooperate with an external calendar service (not shown), such as Microsoft® Exchange® or the like, in which case all or a portion of calendar records 231 can be stored by the external calendar service.

Management database(s) 220 can also store enterprise device records 232. Enterprise device records 232 include information identifying certain enterprise devices 130 and their locations. Enterprise device records 232 allow cloud-based conferencing service 211 to communicate with specified enterprise devices 130 during we conferences. Enterprise device records 232 can be established and maintained by the I.T. Dept. of the enterprise.

In certain embodiments, cloud-based conferencing service 211 can access user information 263 to obtain information related to users, and device information 243 to obtain information related to client, devices 110. Cloud-based conferencing service 211 can cross-reference user information 263 and device information 243 to determine a list of client devices for each user.

In other embodiments, cloud-based conferencing service 211 can maintain its own conferencing user/device records 242 having user information and device information, rather than leveraging that maintained by management service 210. That is, cloud-based conferencing service 211 can perform its own management of host client device 110H and recipient client device(s) 110R. In such case, host client device 110H and recipient client device(s) 110R can optionally also be managed through management service 210. Thus, in general, a client device 110 can be authorized to schedule, initiate, and Join web conferences, and send and receive content streams associated with web conferences. Such authorization can be handled by cloud-based conferencing service 211 and conferencing user/device records 242. Some or all of client devices 110 can also be managed by management server 120 through management service 120. Alternatively, as described in embodiments above, all of client devices 110 can be managed through management service 120, and cloud-based conferencing service 211 can leverage such management and omit maintaining separate conferencing user/device records 242.

Figure 3:
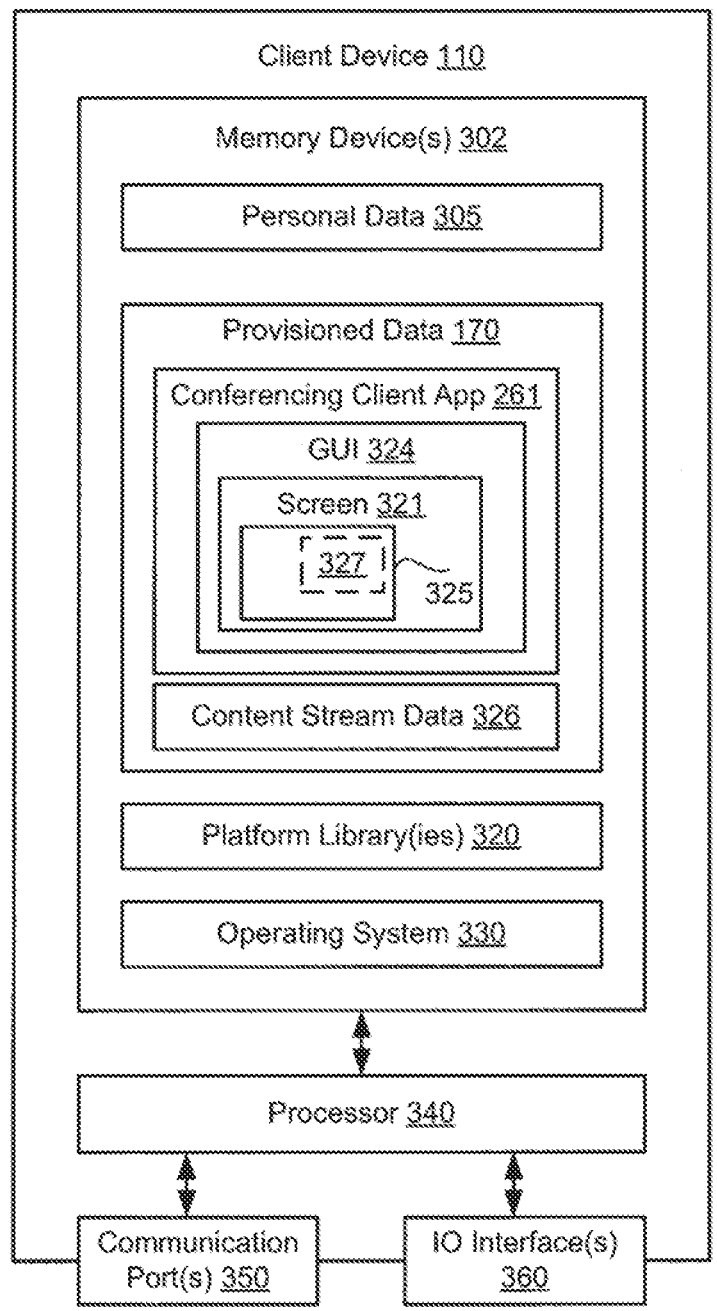
FIG. 3 is a block diagram illustrating an embodiment of a client device.

FIG. 3 is a block diagram illustrating an embodiment of a client device 110. Client device 110 can include at least one processor 340 (e.g., a processor, co-processor, and/or processing circuitry) and at least one memory device 302. Depending on the configuration and type of client device 110, memory device 302 may comprise volatile (e.g., random access memory (RAM)), non-volatile (e.g., read-only memory (ROM)), flash memory, or any combination thereof). Memory device 302 may store executable programs (e.g., program code instructions) and related data components of various applications and modules for execution by processor 340. Memory device 302 may be communicatively coupled to processor 340 (e.g., through at least one system bus for transferring data there between).

Basic functionality of client device 110 may be provided by at least one operating system 330, which may be stored in memory device 302 of client device 110 and may be executed by processor 340 of client device 110. In certain embodiments, at least one programmed software application (e.g., "app" 252) may be executed by utilizing the computing resources of the client device 110. For example, a conferencing client application 261 stored in memory device 302 of client device 110 may be executed by processor 340 of client device 110 under the auspices of operating system 330 of client device 110. Processor 340 of client device 110 may be configured to execute other apps (not specifically shown), such as a web browsing app, an email client app, an instant messaging app, an app configured to securely view and/or modify content, and/or an app capable of accessing resources provisioned to client device 110. Data provided as an input to an app and/or generated as output from an app may be stored in memory device(s) 302 of client device 110 and may be read by processor 340 of client device 110 as needed during the course of execution of the app.

Client device 110 may include at least one communication port 350. It will be understood that although a single communication port 350 is depicted, any number of communication ports 350 may be present according to other example configurations of client. device 110. In some embodiments, communication port 350 may be configured to provide client device 110 with a communication channel to other devices, such as management server 120, and/or remote services, such as another client device 110, management service 210, cloud-based conferencing service 211, notification service 260, gateway service 270, app service 280, or content service 290. For instance, client device 110 may be managed (and/or provisioned with resources 250) by management service 210 (e.g., directly or through the gateway service 270) with the assistance of communication port 350, which may facilitate a communication channel between client device 110 and the appropriate remote service.

More specifically, communication port 350 may include components such as a wireless network connectivity interface, an Ethernet network adapter, and/or a modem that may assist in connecting client device 110 to a network, other devices, or other services, as described herein. For example, the wireless network connectivity interface may comprise one and/or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, communication port 350 may additionally or alternatively include at least one antenna, supporting hardware and/or software, and/or supporting circuitry configured to receive and/or transmit signals according to any short-range communication protocols and/or standards, such as, for example, near field communication (NFC), Bluetooth, and/or Bluetooth Low Energy (BLE). According to some embodiments, communication port 350 may additionally or alternatively include at least one interface configured to provide location services, such as at least one antenna, supporting hardware and/or software, and/or supporting circuitry configured to receive signals transmitted from GPS satellites.

In certain embodiments, client device 110 may receive data as user input via at least one input/output interface 360, such as a keyboard, a mouse, a pen, a stylus, a sound input device, a touch input device, a biometric device, a capture device, a brain-computer interface (BCI), and/or the like. Input/output interfaces 360 may additionally or alternatively include at least one sensing device, such as a camera, a microphone, a motion detector, a proximity sensor, and/or a biometric sensors (e.g., a sensor configured to capture visual, aural, physical, and/or other types of stimuli and/or information, such as spoken words, motions, gestures, and biometric signatures).

Similarly, in some embodiments, client device 110 may present data to a user of client device 110 via the input/output interfaces 360, such as data generated by apps during the execution of the apps. Input/output interfaces 360 may include at least one device configured to provide information and/or stimuli to a user of client device 110. In particular, input/output interfaces 360 may include at least one of a display device (e.g., monitor, screen and/or touchscreen), speakers, a force, vibration, and/or haptic feedback generating device, an implanted and/or a physiologically integrated output device, and a heads-up display device. It will be understood that although input/output interfaces 360 are depicted as a combined component in FIG. 3, they may, according to example embodiments, be embodied by at least one component that exclusively provides input functionality or output functionality.

In certain embodiments, memory device(s) 302 may include a platform library 320. Platform library 320 may include a plurality of procedures (e.g., computing functionality), which may include procedures that may be useful to operating system 330, apps accessible to client device 110, and/or remote services communicatively coupled to client device 110 (e.g., management service 210 or cloud-based conferencing service 211). In one embodiment, platform library 320 may include a plurality of system utilities (e.g., procedures required for the maintenance of client device 110 itself). In one embodiment, platform library 320 may include a software development kit (SDK) e.g., procedures required for at least one app accessible to client device 110). These procedures may be accessed by client device 110 as needed so that operating system 330, apps, and/or remote services do not have to include the procedures in their codebase, which may provide for memory consumption savings and a consistent user experience.

In some embodiments, the procedures of platform library 320 may be implemented on client device 110 through at least one application programming interface (API). More specifically, an API may be configured to listen for (e.g., maintain an open port via which it may receive) a corresponding procedure call 240; that is, an API may correspond to a procedure call 240 such that the API recognizes procedure call 240 as a valid and authorized request to perform at least one particular procedure of platform library 320. In an instance in which an API receives a corresponding procedure call 240, the API may relay procedure call 240 to the corresponding procedure of platform library 320 such that the procedure is performed by client device 110. For instance, when an API for erasing all data from client device 110 receives a procedure call 240 instructing client device 110 to erase all data from client device 110, the API may direct operating system 330 of client device 110 to the location of the procedure in platform library 320 (e.g., the codebase for erasing all data from client device 110) such that operating system 330 of client device 110 may process the procedure, which may in turn erase all data from client device 110.

In certain embodiments, memory device(s) 302 may further include a plurality of personal data 305. Personal data 305 may include, for instance, any data accessible to (and/or stored within) client device 110 that is personal to a user of client device 110; that is, personal data 305 may be distinct from provisioned data 170 in that provisioned data 170 may not be personal to the user of client device 110 because provisioned data 170 may be personal to a particular enterprise. Nevertheless, similar to provisioned data 170 (specifically, resources 250), personal data 305 may include apps, content, and/or profiles. Additionally, in some embodiments, personal data 305 may include user data associated with at least one user of client device 110. For example, user data may include at least one user preference (e.g., parameters that may affect the experience of the user) and/or at least one characteristic describing a user (e.g., a user's age, gender, bodily traits).

With respect to the cloud-based conferencing system, client device 110 includes conferencing client app 261. Conferencing client app 261 can be provisioned to client device 110 as part of provisioned data 170 by management server 120. Conferencing client app 261 communicates with cloud-based conferencing service 211 to create web conferences, initiate scheduled web conferences, send content streams, join scheduled web conferences, and receive content streams. Conferencing client app 261 can present a GUI 324 to a user of client device 110 that allows the user to create web conferences, initiate scheduled web conferences, and join scheduled web conferences. GUI 324 can include a screen 321 that is displayed to the user. When client device 110 is operating as host client device 110H, conferencing client app 261 captures at least a portion of screen 321 as a content stream for a web conference. For example, screen 321 can include a window 325 that displays text, graphics, video, and the like. Window 325 can comprise all or a portion of screen 321. Conferencing client app 261 can capture content from IO interface(s) 360 in addition to that displayed on screen 321, such as audio from a microphone, video from a camera, and the like. When client device 110 is operating as a recipient client device 110R, screen 321 can display a content stream 262 of a web conference. In an embodiment, screen 321 displays a live portion of a content stream 262 of a web conference in window 325.

In certain embodiments, client device 110 can buffer content stream data 326 from a content stream of a web conference in memory device(s) 302. Content stream data 326 is part of provisioned data 170 managed by management server 120. Content stream data 326 can comprise all or a portion of a content stream 262 of a web conference. A user of client device 110 can interact with GUI 324 to display a prior portion of a content stream 262 in another portion of screen 321, such as a window 327 within window 325. That is, a prior portion of a content stream 262 can be displayed over a live portion of such content stream 262 (e.g., a "picture-in-picture" (PIP) type display). The prior portion of a content stream 262 can be obtained from content stream data 326 buffered in memory device(s) 302. This allows a user to view a prior portion of a content stream 262 without interrupting the host or other participants of the web conference. GUI 324 is configured to allow the user to seek backward and forward through the prior portion of a content stream 262. The live portion of a content stream 262 can be displayed concurrently with the prior portion in window 325. Alternatively, window 327 can be coextensive with window 325, obscuring the live portion of a content stream 262 until the user is finished viewing the prior portion of such content stream.

Figure 4:
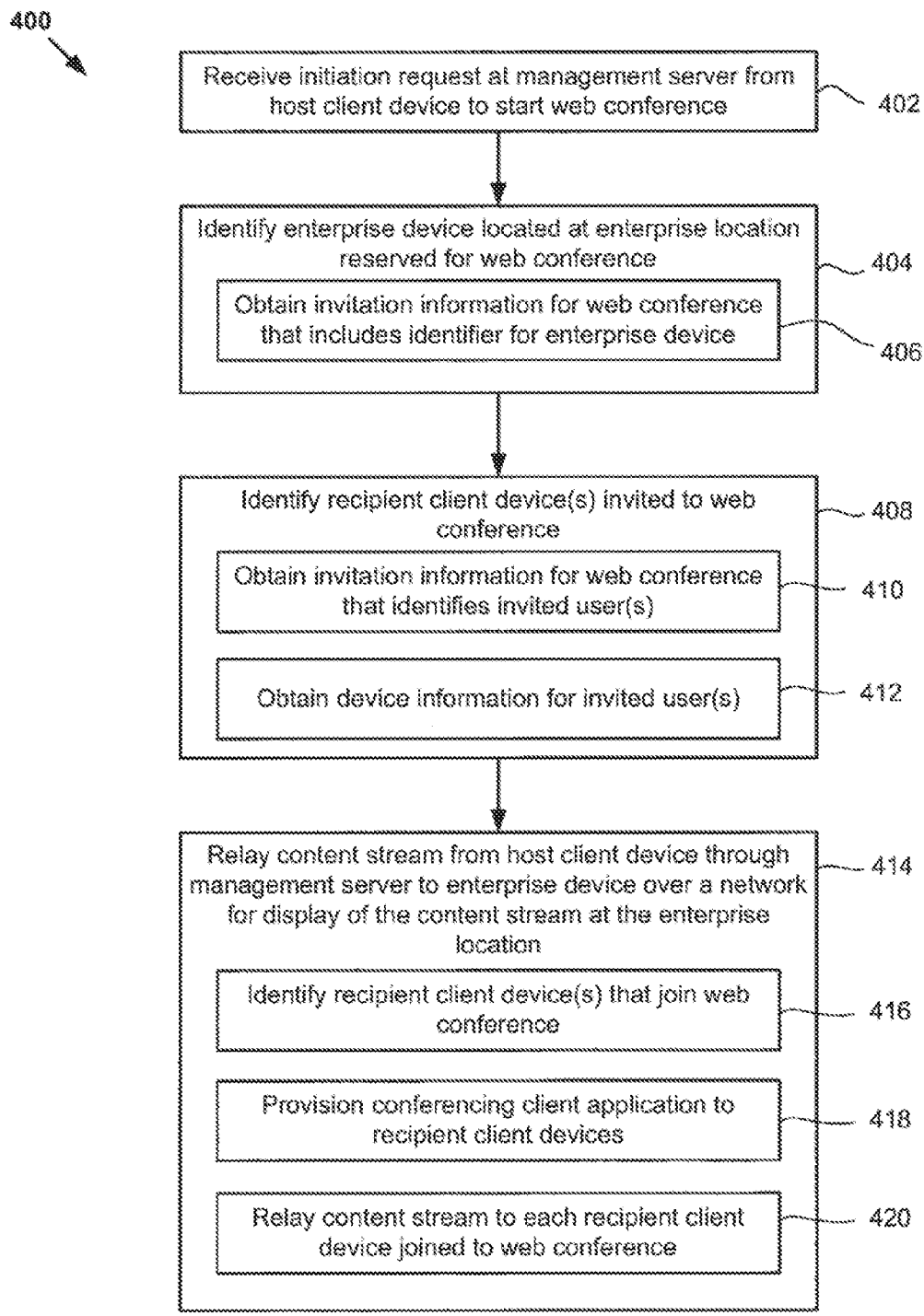
FIG. 4 is a flow diagram illustrating a method of web conferencing according to embodiments.

FIG. 4 is a flow diagram illustrating a method 400 of web conferencing according to embodiments. Method 400 can be performed by management server 130 within operating environment 100. Prior to method 400, various client devices 110 can enroll with management service 210 fix management by management server 120, as discussed above. Alternatively, various client devices 110 can enroll with cloud-based conferencing service 211, as discussed above. In either case, various client devices 110 are authorized to communicate with management server 120 and obtain resources 250 therefrom. Further, prior to method 400, a user of host client device 110H has communicated with cloud-based conferencing service 211 to schedule a web conference, as discussed above.

Method 400 begins at step 402, where management server 120 receives an initiation request from host client device 110H to initiate a scheduled web conference. In some embodiments, host client device 110H is managed by management service 210 of management server 120. At step 404, management server 120 identifies an enterprise device 130 located at an enterprise location 160 reserved for the scheduled web conference. As noted above, enterprise device 130 is communicatively coupled to management server 120 over network(s) 150. Step 404 can include a step 406, where management server 120 obtains invitation information 241 for the scheduled web conference that includes an identifier for enterprise device 130. Management server 120 can lookup enterprise device 130 in enterprise device records 232 to obtain address information for enterprise device 130 on network(s) 150.

At step 408, management server 120 can identify recipient client device(s) TOR invited to the scheduled web conference (if any). Step 408 can include a step 410, where the management server 120 obtains invitation information 241 for the scheduled web conference that identifies invited user(s). At step 412, management server 120 can obtain device information (e.g., device information 243 or conferencing user/device records 242) for the invited user(s).

At step 414, management server 120 relays a content stream from host client device 110H to enterprise device 130 over network(s) 150 for display of the content stream at enterprise location 160. Step 414 can include a step 416, were management server 120 identifies recipient client device(s) 110R that join the scheduled web conference. At step 418, management server 120 can provision conferencing client app 261 to any recipient client device 110R not having such application installed. At step 420, management server 120 relays the content stream to each recipient client device 110R that has joined the scheduled web conference (if any).

In this manner, a host of a we conference can utilize an enterprise device, such as a projector, without having to be physically present in the enterprise location having the enterprise device. Also, the host can initiate and present using any type of client device (e.g., mobile telephone), regardless of whether such client device has the capability of connecting to the enterprise device (e.g., projector). Thus, the user avoids having to locate a mechanism for connecting his or her client, device to the enterprise device (e.g., a dongle or the like). Furthermore, participants in the web conference have the option of being remote from the enterprise location having the enterprise device and still participating in the web conference using their client devices. Also, both remote participants and participants local to the enterprise device can use their client devices to view the content stream being presented, and also view prior portions of the content stream, as discussed above.

Figure 5:
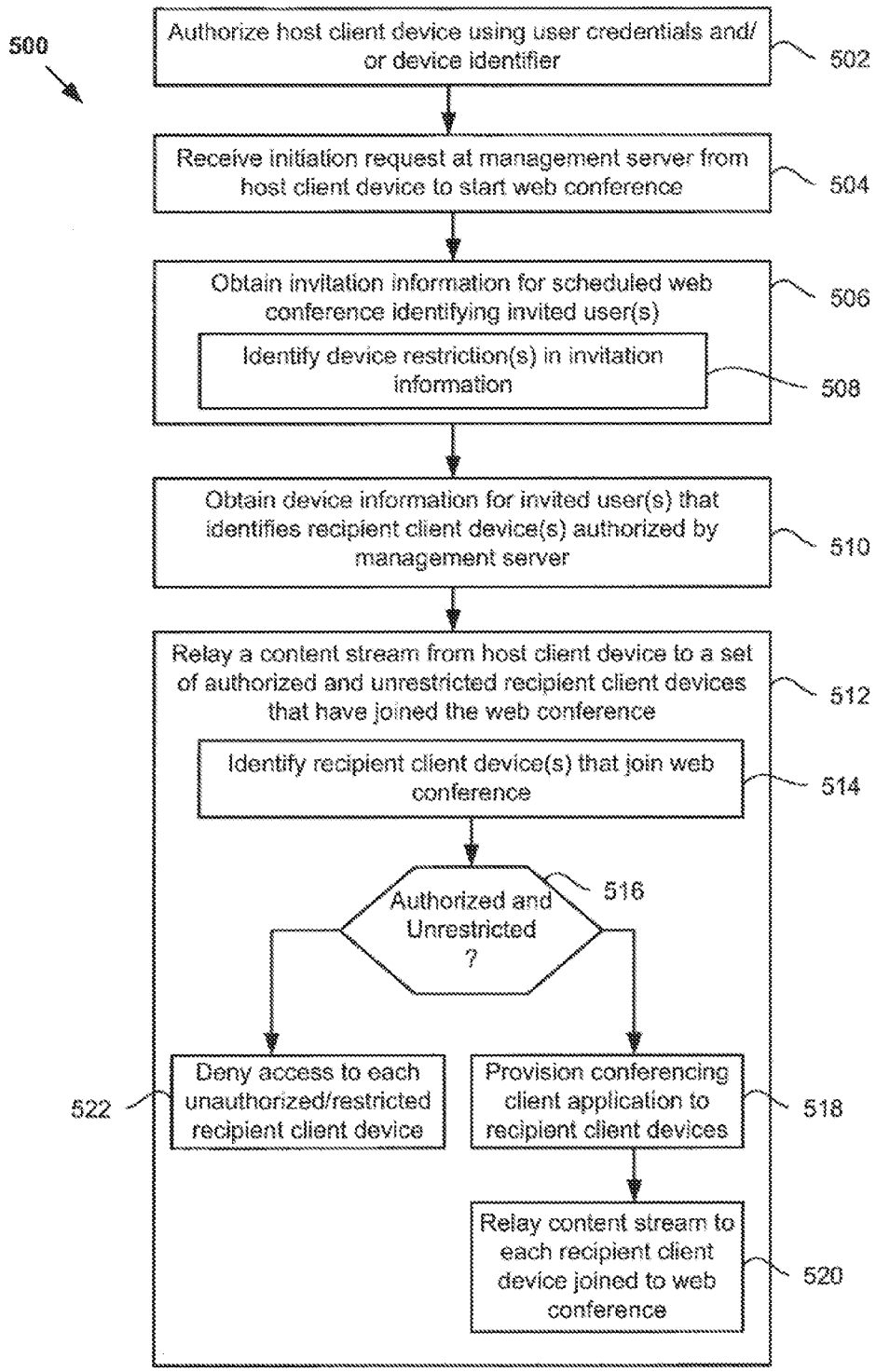
FIG. 5 is a flow diagram illustrating a method of web conferencing according to embodiments.

FIG. 5 is a flow diagram illustrating a method 500 of web conferencing according to embodiments. Method 500 can be performed by management server 120 within operating environment 100. Prior to method 500, various client devices 110 can enroll with management service 210 for management by management server 120, as discussed above. Alternatively, various client devices 110 can enroll with cloud-based conferencing service 211, as discussed above. In either case, various client devices 110 are authorized to communicate with management server 120 and obtain resources 250 therefrom. Further, prior to method 500, a user of host client device 110H has communicated with cloud-based conferencing service 211 to schedule a web conference, as discussed above.

Method 500 begins at step 502, where management server 120 can authorize host client device 110H using user credentials, device identifier, or both. At step 504, management server 120 can receive an initiation request from host client device 110H to start a scheduled web conference. At step 506, management server 120 can obtain invitation information 241 for scheduled web conference that identifies invited user(s). Step 506 can include a step 508, where management server 120 identifies device restriction(s) (if any) included in invitation information 241 ("device restriction information"). As described above, invitation information 241 can specify which client devices 110 are allowed to join a scheduled web conference based on some attribute, such as identifier, type, and the like. The device restriction information can include, for example, restrictions based on location, network connection, operating system version, software version, or the like.

At step 510, management server 120 obtains device information (e.g., device information 243 or conferencing user/device records 242) for invited user(s). The device information identifies recipient client devices 110R that are authorized by management server 120 (e.g., through management service 210 and/or cloud-based conferencing service 211). At step 512, management server 120 relays a content stream from host client device 11011 to a set of authorized and unrestricted, recipient client devices that have joined the web conference. Step 512 can include a step 514, where management server 120 identifies recipient client devices 110R that have joined the scheduled web conference. At step 516, the management server 120 determines whether the recipient client device(s) 110R that attempted to join the web conference are authorized and unrestricted. For each of recipient client device(s) 110R that is not authorized or is restricted, management server 120 denies access to the web conference at step 522. For each of recipient client device(s) 110R that is authorized and unrestricted, management server 120 can perform steps 518 and 520. At step 518, management server 120 can provision conferencing client app 261 to any recipient client device 110R not having such application installed. At step 520, management server 120 relays the content stream to each recipient client device 110R that has joined the scheduled we conference (if any). In this manner, a cloud based conferencing service provides an integrated solution for hosting and participating in web conferences with secured access by authorized and unrestricted client devices.

Figure 6:
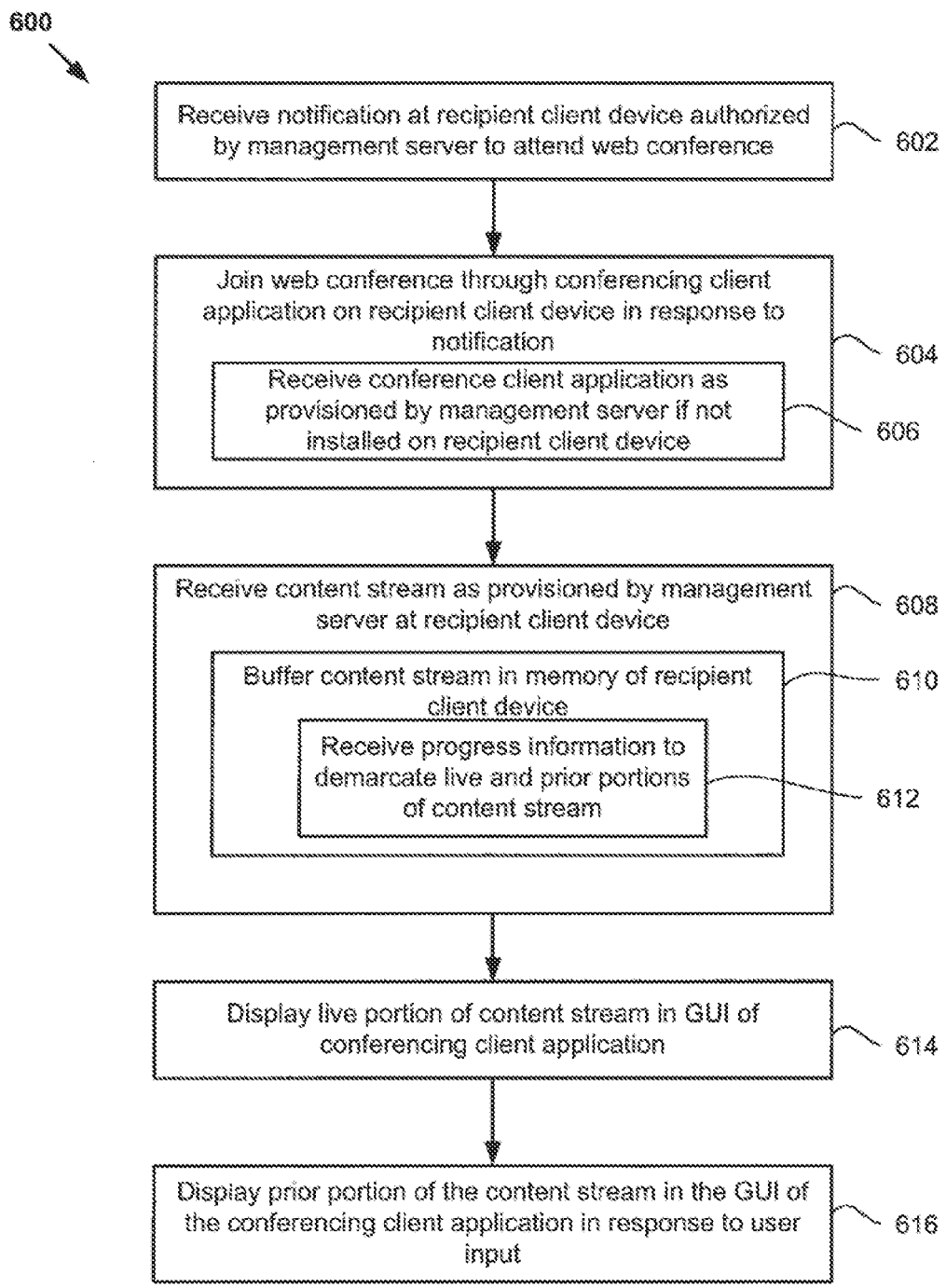
FIG. 6 is a flow diagram illustrating a method of attending a scheduled web conference according to embodiments.

FIG. 6 is a flow diagram illustrating a method 600 of attending a scheduled web conference according to embodiments. Method 600 can be performed by a client device 110 operating within operating environment 100. Prior to method 600, various client devices 110 can enroll with management service 210 for management by management server 120, as discussed above. Alternatively, various client devices 110 can enroll with cloud-based conferencing service 211, as discussed above. In either case, various client devices 110 are authorized to communicate with management server 120 and obtain resources 250 therefrom. Further, prior to method 600, a user of host client device 110H has communicated with cloud-based conferencing service 211 to schedule a web conference, as discussed above. Method 600 can be performed by a recipient client device 110R.

At step 602, recipient client device 110R receives a notification to attend a scheduled web conference for which the recipient client device 110R is authorized to attend. At step 604, recipient client device 110R joins the scheduled web conference through a conferencing client application in response to the notification. For example, a user of recipient client device 110R can interact with GUI 324 to join the web conference in response to receiving the notification. Step 604 can include a step 606, where recipient client device 110R can receive conferencing client application 261 if such application has not already been installed.

At step 608, recipient client device 110R receives a content stream as provisioned by management server 120. Step 608 can include a step 610, where recipient client device 110R buffers the client stream in memory device(s) 302. Step 610 can include a step 612, where recipient client device 110R receives progress information to demarcate live and prior portions of content stream. As noted above, management server 120 can store the content stream as the content stream is received from host client device 110H. Recipient client device 110R may join web conference at some time after web conference has been started. In such case, management server 120 can indicate prior and live portions of the content stream. Recipient client device 110R can receive the prior portion of the content stream and begin buffering the content stream.

At step 614, recipient client device 110R displays a live portion of the content stream in GUI 324 of conferencing client application 261. At step 616, recipient client device 110R displays a prior portion of the content stream in GUI 324 of conferencing client application 261 in response to user input. As noted above, the user can seek backward and forward within the prior portion of the content stream. The user can concurrently view the live portion of the content stream along with the prior portion of the content stream. In this manner, if the user misses any part of the content stream or desires to refer back to a portion of the content stream during the web conference, the user does not have to interrupt the host or other participants. The user can view a prior portion of the content stream without affecting the host or other participants.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs, it should be noted that these embodiments may also apply to other examples of contexts, such as containers not including a guest operating system, referred to herein as "OS less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate names aces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore various virtualization operations may be wholly or partially implemented in hardware. For example, a hardware implementation may employ a look up table for modification of storage access requests to secure non-disk data.

Many variations, modifications, additions, and improvements are possible, regardless the degree of virtualization. The virtualization software can therefore include components of a host, console, or guest operating, system that performs virtualization functions, Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fail within the scope of the disclosure. in general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claim(s).

I claim:

1. A method of web conferencing, comprising:
   receiving an initiation request at a management server from a host client device to initiate a scheduled web conference;
   obtaining invitation information for the scheduled web conference, the invitation information identifying at least one user and specifying device restriction information;
   obtaining management records for the at least one user, the management records comprising a history of management operations performed on at least one recipient client device associated with the at least one user prior to the at least one user being invited to the scheduled web conference, wherein the history of management operations includes at least one determination of whether the at least one recipient client device is compliant with a profile that restricts an operation of the at least one recipient client device;
   authorizing the at least one recipient client device based on the management records and the device restriction information; and
   providing to the at least one recipient client device a notification for joining the scheduled web conference.

2. The method of claim 1, wherein the invitation information and the management records are stored in a database accessible by the management server.

3. The method of claim 1, further comprising relaying a content stream from the host client device through the management server to the at least one recipient client device for display of the content stream.

4. The method of claim 3, wherein the relaying comprises:
   identifying each of the at least one recipient client device to join the scheduled web conference; and
   denying access to the scheduled web conference to each of the at least one recipient client device that is not authorized by the management server.

5. The method of claim 3, wherein the content stream comprises at least a portion of content displayed by a screen of the host client device.

6. The method of claim 1, wherein the at least one recipient device is managed by the management server, and wherein the method further comprises:
   provisioning a conferencing client application on the at least one recipient device.

7. The method of claim 1, further comprising:
   receiving user access credentials from the host client device;
   obtaining a device identifier for the host client device;
   authenticating a user of the host client device based at least in part on the user access credentials; and
   authenticating the host client device based at least in part on the device identifier.

8. A system, comprising:
   a memory device; and
   a processor configured to execute instructions stored in the memory device to:
      receive an initiation request at a management server from a host client device to initiate a scheduled web conference;
      obtain invitation information for the scheduled web conference, the invitation information identifying at least one user and specifying device restriction information;
      obtain management records for the at least one user, the management records comprising a history of management operations performed on at least one recipient client device associated with the at least one user prior to the at least one user being invited to the scheduled web conference, wherein the history of management operations includes at least one determination of whether the at least one recipient client device is compliant with a profile that restricts an operation of the at least one recipient client device;
      authorize the at least one recipient client device based on the management records and the device restriction information; and
      provide to the at least one recipient client device a notification for joining the scheduled web conference.

9. The system of claim 8, wherein the invitation information and the management records are stored in a database accessible by the management server.

10. The system of claim 8, further comprising relaying a content stream from the host client device through the management server to the at least one recipient client device for display of the content stream.

11. The system of claim 10, wherein the relaying comprises:
    identifying each of the at least one recipient client device to join the scheduled web conference; and
    denying access to the scheduled web conference to each of the at least one recipient client device that is not authorized by the management server.

12. The system of claim 10, wherein the content stream comprises at least a portion of content displayed by a screen of the host client device.

13. The system of claim 8, wherein the at least one recipient client device is managed by the system, and wherein the processor is configured to provision a conferencing client application on the at least one recipient device.

14. The system of claim 8, wherein the processor is configured to:
    receive user access credentials from the host client device;
    obtain a device identifier for the host client device;
    authenticate a user of the host client device based at least in part on the user access credentials; and
    authenticate the host client device based at least in part on the device identifier.

15. A non-transitory computer readable medium comprising instructions, which when executed in a computer system, causes the computer system to carry out a method of web conferencing, comprising:
    receiving an initiation request at a management server from a host client device to initiate a scheduled web conference;
    obtaining invitation information for the scheduled web conference, the invitation information identifying at least one user and specifying device restriction information;
    obtaining management records for the at least one user, the management records comprising a history of management operations performed on at least one recipient client device associated with the at least one user prior to the at least one user being invited to the scheduled web conference, wherein the history of management operations includes at least one determination of whether the at least one recipient client device is compliant with a profile that restricts an operation of the at least one recipient client device;

authorizing the at least one recipient client device based on the management records and the device restriction information; and providing to the at least one recipient client device a notification for joining the scheduled web conference.

16. The non-transitory computer readable medium of claim 15, wherein the invitation information and the management records are stored in a database accessible by the management server.

17. The non-transitory computer readable medium of claim 15, further comprising relaying a content stream from the host client device through the management server to the at least one recipient client device for display of the content stream.

18. The non-transitory computer readable medium of claim 17, wherein the relaying comprises:

identifying each of the at least one recipient client device to join the scheduled web conference; and denying access to the scheduled web conference to each of the at least one recipient client device that is not authorized by the management server.

19. The non-transitory computer readable medium of claim 15, wherein the at least one recipient client device is managed by the management server, and wherein the method further comprises:

provisioning a conferencing client application on the at least one recipient device.

20. The non-transitory computer readable medium of claim 15, further comprising:

receiving user access credentials from the host client device;

obtaining a device identifier for the host client device;

authenticating a user of the host client device based at least in part on the user access credentials; and authenticating the host client device based at least in part on the device identifier.

* * * * *